United States Patent [19]
Solbeck

[11] 3,849,051
[45] Nov. 19, 1974

[54] EXTRUSION APPARATUS
[76] Inventor: Erik Solbeck, 342, Vedbaek Strandvej, Vedbaek, Denmark
[22] Filed: Feb. 1, 1973
[21] Appl. No.: 328,556

[30] Foreign Application Priority Data
Feb. 16, 1972 Denmark............................. 719/72
Feb. 16, 1972 Denmark............................. 720/72

[52] U.S. Cl............. 425/376, 264/176 R, 156/244, 156/500
[51] Int. Cl............................................. B29f 3/00
[58] Field of Search .......... 425/376, 377, 461, 516; 264/176 R; 156/244, 500

[56] References Cited
UNITED STATES PATENTS
2,686,335   8/1954   Gross................................. 425/376
3,116,194  12/1963   Looser................................ 156/500
3,123,859   3/1964   Baraihsky........................... 425/376

FOREIGN PATENTS OR APPLICATIONS
931,372   10/1947   France............................... 425/516
1,264,744  3/1968   Germany............................ 425/376

Primary Examiner—R. Spencer Annear

[57] ABSTRACT

An extrusion apparatus for producing sheet-material in great width dimensions and consisting at least partly, of a thermoplastic material, in which one and the same die channel in a wide-orifice extrusion die is supplied with melted thermoplastic material through direct communications from at least two extruders, at least one of which is supported for movement in the axial direction of the die to compensate for thermal expansion thereof. The sheet-material extruded from the die is conveyed to by means of a roller system which is mounted to be displaceable traversely to the axial direction of the die to provide access for cleaning and adjustment thereof.

11 Claims, 10 Drawing Figures

EXTRUSION APPARATUS

BACKGROUND OF THE INVENTION

The present invention relates to an extrusion apparatus for producing sheet material in great width dimensions and consisting at least partly, of a thermoplastic material.

The term "extrusion apparatus" as used above shall be understood so as to comprise both an extrusion apparatus for producing sheets consisting entirely of plastic material whatever it is a question of single layer films manufactured from a single thermoplastic base material or of composite films produced by coextrusion of a number of base materials, and a coating apparatus in which a sheet of previously produced material, by being conveyed past the outlet slit of an extrusion die, is provided with a coating of thermoplastic material.

Usually, the liquid thermoplastic material is supplied to the die channel from a single extruder which, in a typical construction, may contain a supply of powdered or granulated material which is conveyed into a cylinder, through which, while being melted at the same time, the material is forced by means of a motor-driven agitating member towards a connecting duct, through which it is introduced into the die channel.

In order to achieve a uniform quality in the lateral direction of an extruded film of thermoplastic material it is necessary to ensure an even and adequate flow of the melted plastic material throughout the length of the die channel. A relatively simple measure for this purpose consists in providing the extrusion die with external heating elements fitted along the die at regular mutual distances. However, a more reliable result and the possibility of producing a film of a greater width is achieved by supplying the melted plastic material through a number of connecting ducts distributed over the length of the die channel, said ducts being connected to a common extruder or to individual extruders.

A sheet extrusion apparatus having material supplied to one die channel through a number of connecting ducts from a common extruder is known from French Pat. specification No. 1,360,137.

A more specific and complicated apparatus for producing profiled plastic plates of a relatively greater thickness is known from German publication DAS No. 1,264,744, in which a common die channel is fed from a number of extruders via branched connecting duct systems so that a very large number of inlet apertures for the melted material are formed over the entire length of the die channel.

However, even when utilizing these measures which, as a matter of fact, have the disadvantage that a significant loss of heat is introduced due to the relatively long connecting ducts between extruder and die channel, it is not possible with wide-orifice extrusion dies of known construction to extrude plastic material in widths exceeding 7 to 8 feet.

However, in many applications of thermoplastic film material, for example, when coating very wide paper sheets with plastic, or when producing reinforced sheets where mats or grids of natural or synthetic fibres or mineral or glass fibres are coated with extruded plastic material on one or both sides for utilization as an insulating or covering material, e.g., in the building industry, there exists a need for materials of a significantly greater width.

SUMMARY OF THE INVENTION.

The invention provides an extrusion apparatus for producing sheet-material in great width dimensions consisting at least partly of a thermoplastic material, comprising at least two extruders; a wide-orifice extrusion die including at least one die channel extending throughout the length of the die and an outlet slit communicating with said die channel for extruding thermoplastic material; means for connecting said extruders to said extrusion die to provide a direct communication from each extruder to one and the same die channel; a roller support system including at least one cooling roller for cooling the sheet-material subsequent to the extrusion of thermoplastic material and a number of transport rollers for conveying the sheet material produced after cooling; means for supporting at least one of said extruders for movement in the axial direction of the extrusion die; and means for mounting said roller support system to be displaceable transversely to the axial direction of the die.

The invention is based on the recognition of the fact that by introducing thermoplastic material in a melted condition in one and the same die channel from at least two extruders in the above-mentioned manner it is possible to obtain an adequate flow throughout the length of a very long die channel, while it is simultaneously ensured by supporting one or more extruders for movement in the axial direction of the die that such a long extrusion die is not subjected to deflecting resulting from thermal expansion of the die. Furthermore, the movability of the roller support system transversely to the extrusion die provides an easy access to inspection, cleaning and adjustment of the extrusion die and, in particular, the outlet slit.

With an extrusion apparatus according to the invention it has been found possible in practice to produce single and composite films in widths up to approximately 15 feet, so that a considerable improvement is achieved over the prior art.

In spite of the great length of the extrusion apparatus according to the invention (in the direction transverse to the width of the sheet material) it is of a simple construction and demands only a relatively small space, since the extrusion die is supported solely by the extruders so that no need exists for special die supporting means.

It is observed in this connection that it is known, from an extrusion apparatus with a wide-orifice extrusion die fed from a single extruder, to mount the extruder in such a way that it is displaceable, together with the extrusion die, relative to a roller system in a direction transversely to the axial direction of the die, the purpose being to enable the combined extruder and die to be pulled away from a roller system or calender for cleaning and adjusting purposes. Furthermore, a movable roller system for use in an extrusion apparatus and including four rollers mounted one above the other is known in itself from German non-accepted publication OS No. 2,006,650. However, these known solutions to the problem of obtaining access to an extrusion die have nothing to do with the present invention, which relates to a complete extrusion apparatus for producing sheet material in great width dimensions.

BRIEF DESCRIPTION OF THE DRAWINGS.

The invention will now be explained in greater detail with reference to the accompanying drawings, in which.

DETAILED DESCRIPTION

Figure 1:
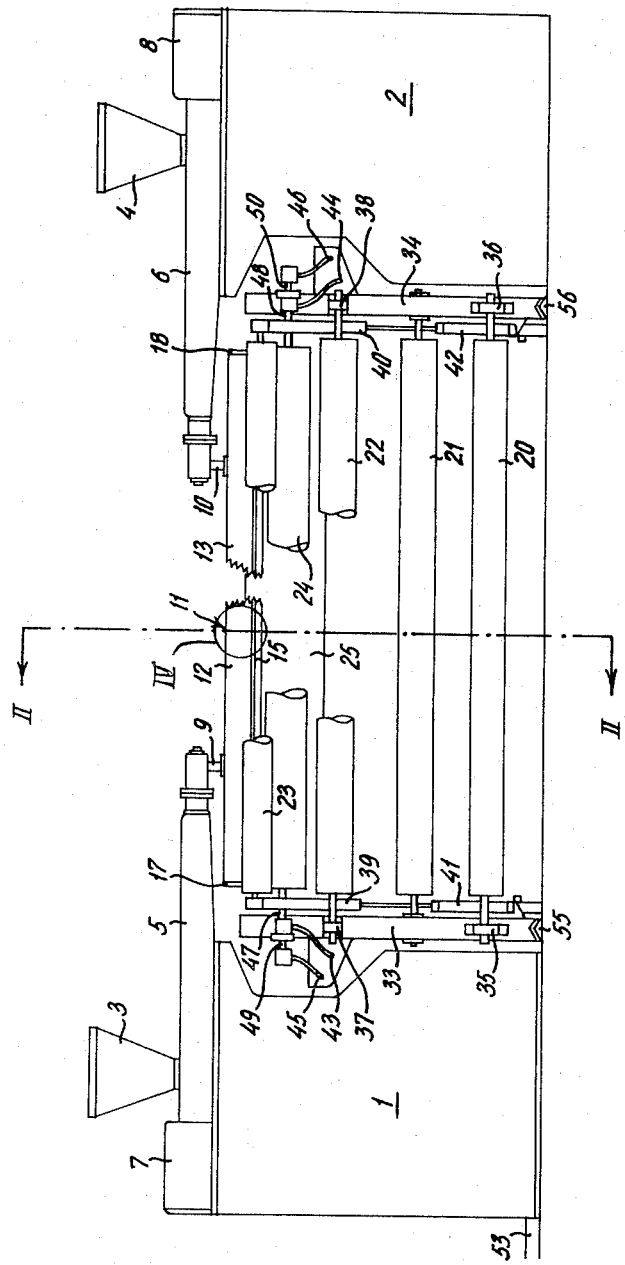
FIG. 1 shows an embodiment of an extrusion apparatus according to the invention for coating a flexible sheet with a layer of thermoplastic material.
Figure 2:
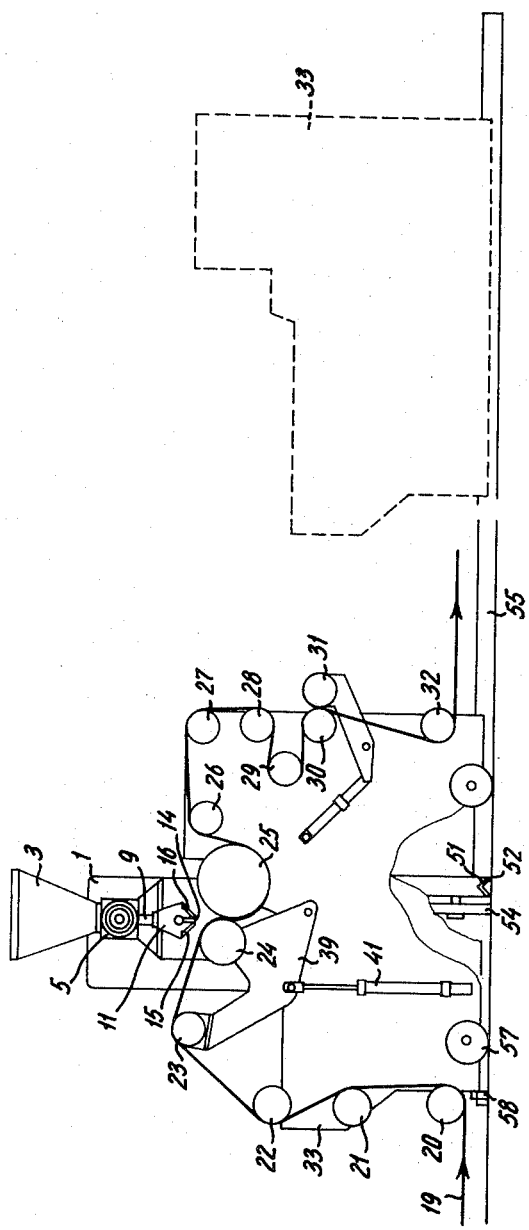
FIG. 2 is a sectional view taken along line II—II of FIG. 1.
Figure 3:
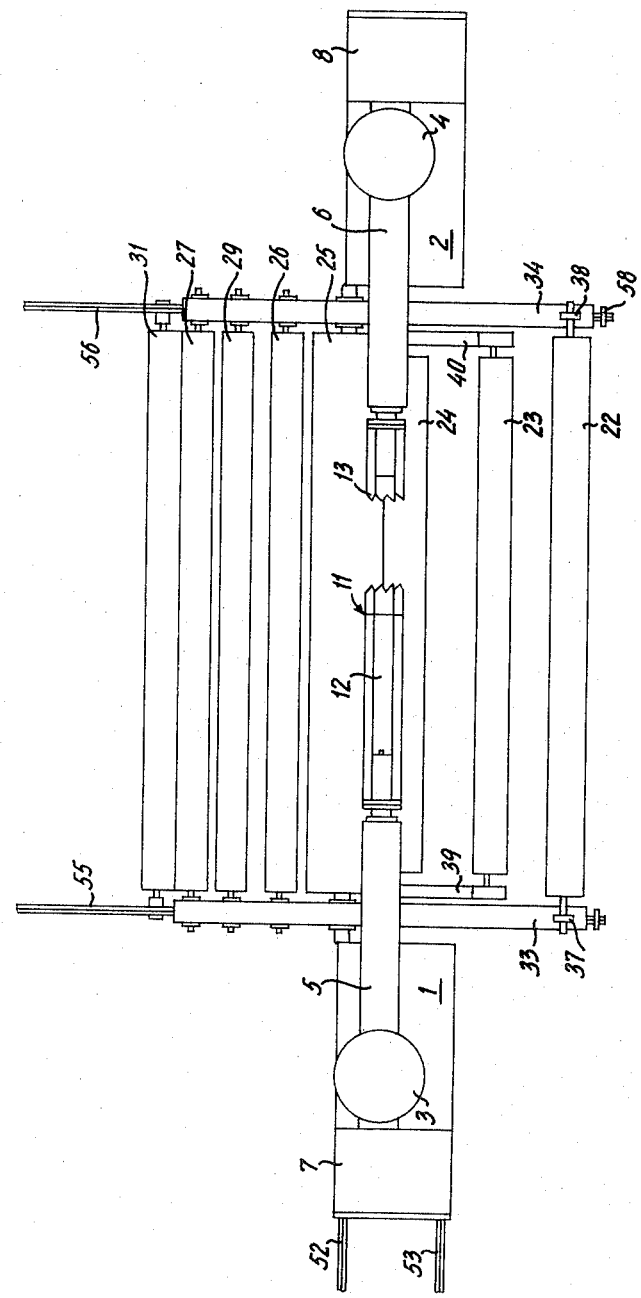
FIG. 3 is a plane view of the apparatus illustrated in FIGS. 1 and 2.

In FIGS. 1 to 3 an embodiment of an extrusion apparatus according to the invention is shown in which a previously produced sheet consisting, for example, of paper or of a reinforcing fibre grid is provided with a coating of thermoplastic material by conveying the sheet past the outlet slit of a wide-orifice extrusion die, the side of the sheet intended to receive said coating facing the slit. The apparatus shown comprises two extruders 1 and 2 which are supplied with thermoplastic base material, for example in powdered or granulated form through filling funnels 3 and 4, respectively, communicating with extrusion cylinders 5 and 6, respectively, in which the plastic material, while being heated is forced, by means of screws, not shown, which are driven by motors 7 and 8, respectively, through connecting ducts 9 and 10 into one and the same die channel in the wide-orifice extrusion die which is designated by reference numeral 11.

The embodiment shown of the apparatus according to the invention is intended for producing very wide sheets of reinforced plastic material, i.e., a sheet comprising a grid of natural or synthetic fibres or mineral or glass fibres which are coated with thermoplastic material.

The basic sheet 19, to which a coating of plastic material is to be applied, is conveyed by means of transport rollers 20, 21, 22 and 23 to a pair of co-operating rollers 24 and 25 the passage between which is located immediately below outlet slit 14 of the extrusion die through which the melted thermoplastic material introduced under pressure into the die channel of extrusion die 11, is extruded and deposited onto the sheet 19. In connection herewith, rollers 24 and 25 — the roller 24 of which acts as a pressure roller — serve, as will be described below, to cool the plastic-coated sheet. After having passed outlet slit 14, the sheet 19 is conveyed around roller 25 to a further conveying system consisting of rollers 26-32, whereupon it is conducted to a collecting roll not shown in the drawing.

All the rollers 20–32 of the above-mentioned roller arrangement are mounted in a common roller support system or calender with lateral frames 33 and 34, in which bearings for the roller shafts are mounted. Transport rollers 20 and 22 are, as shown in FIGS. 1 and 3, supported in bearings 35, 36 and 37, 38, respectively, which are mounted on the edge of lateral frames 33 and 34. Transport roller 23 and the cooling roller 24 acting as a pressure roller are mounted in pivotable mounting arms 39 and 40 which are biased, by means of telescopic springs 41 and 42, respectively, against the operative position shown in FIG. 2, in which transport roller 23 exerts a stretching influence on the sheet while cooling roller 24 presses the sheet against cooling roller 25.

Cooling rollers 24 and 25 are cooled by means of water which is conducted through water hoses 43, 44 and 45, 46, respectively, and fittings into and out of the rollers by means of pipe connections 47, 48 and 49, 50 fitted inside the respective roller shafts.

According to the invention, extruder 1 is supported for movement in the axial direction of extrusion die 11, i.e., the width direction of the extruded sheet, in order to be able to absorb the kinetic energy generated by the axial, thermal expansion of the die. Thus, in the embodiment shown, extruder 1 is mounted, by means of guiding members 51 in the form of guide-shoes, on profiled rails 52 and 53 extending parallel to extrusion die 11 and are, in addition, provided with wheels 54. In the sectional view shown in FIG. 2, a portion of one of the lateral frames 33 of the roller support system is removed in order to illustrate the construction of this supporting arrangement in greater detail.

The bottom edges of the lateral frames 33 and 34 of the roller support system are similarly formed as guide-shoes which fit profiled rails 55 and 56 extending transversely to extrusion die 11, said rails being, in the same way as profiled rails 52 and 53 of extruder 1, rigidly secured, for instance, embedded in the fixed support of the entire extrusion apparatus shown. Moreover, in order to achieve a better mobility, the roller support system is provided, in the same way as extruder 1, with wheels such as shown at 57.

In the embodiment shown in FIGS. 1 to 3, the roller support system is displaceable to one side only relative to extruders 1 and 2 and extrusion die 11 and, for this reason, profiled rails 55 and 56 are fitted, as shown at 58, with stop members so as to restrict the movement of the roller support system. However, in this embodiment, where extruders 1 and 2 are mounted in colinear extension of wideorifice extrusion die 11 at opposite ends thereof, there is, in principle, nothing to prevent the roller support system from being displaceable to both sides of the extrusion die, if desired. In this case the roller support system will only have to be provided with appropriate locking meas for securing the system in a well-defined position relative to extrusion die 11.

When cleaning and adjustment of the extrusion die is necessary, the roller support system can be pulled away from the die and extruders 1 and 2, for example, to the position of lateral frame 33 shown in dotted lines in FIG. 2.

In the embodiment shown a wide-orifice extrusion die 11 is employed, which is composed of two die sections 12 and 13 which are tightly clamped together in coaxial extension of each other while the orifice of the outlet slit 14 of the die is defined by two die lips 15 and 16 extending throughout the width of the die. The die sections 12 and 13 are, in the ends remote from each other, sealed by end plates 17 and 18, respectively.

Figure 7:
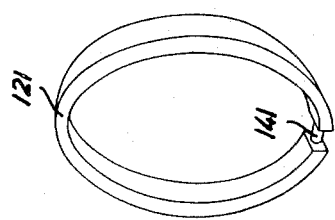
FIG. 7 is a perspective view of a guide ring in the junction between the two die sections of FIG. 4, FIGS. 8 and 9 are sectional views taken along lines VIII—VIII and IX—IX, respectively, of FIG. 4 in order to illustrate means for adjusting the width of the outlet slit of the extrusion die.
Figure 4:
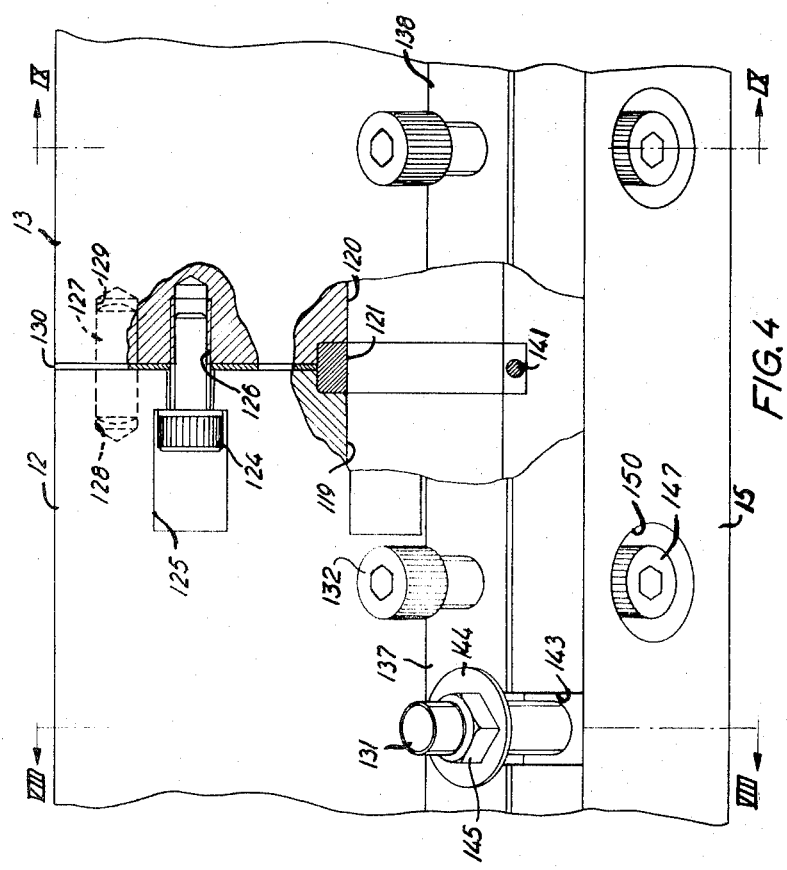
FIG. 4 shows, partly in section, an enlarged portion of the extrusion die of FIG. 1, inside the circular frame IV, in order to illustrate the junction of two die sections in greater detail.

The junction between the two die sections 12 and 13 in the embodiment shown of extrusion die 11 is illustrated in FIG. 4 which shows the portion of the extrusion die in FIG. 1 located within the circular frame IV, parts of the outer wall being removed to illustrate the internal junction of the sections. In the embodiment shown, die sections 12 and 13 are provided with longitudinally extending, deepdrilled cylindrical die channels 119 and 120. In order to ensure, as far as possible, an accurate co-axial mounting of these channels and, also, to compensate for possible inaccuracies arising in the formation of these channels, a guide ring 121 is fitted in the junction, the more detailed construction of which is shown in FIG. 7, said guide ring being mounted in coaxial, cylindrical cut-outs 122 and 123 machined for this purpose around die channels 119 and 120 in the terminal surfaces of die sections 12 and 13 facing each other. The clamping together when assembling the die sections can, as shown, be effected by means of a plurality of screws 124 the heads of which fit into undercut grooves 125 formed in the left-hand die section 12, said screws being screwed into tapped bores 126 in the right-hand die section 13. A guide pin 127 shown in dotted lines in FIG. 2 serves to guide the die sections during the assembling, said guide pin fitting into pin holes 128 and 129 drilled into the topmost portion of die sections 12 and 13, respectively. A metal tightening ring 130, e.g., of copper, surrounds guide ring 121 and serves to tighten the junction between sections 12 and 13.

Furthermore, FIG. 4 shows setting screws 131 and 132 serving to adjust the positions of die lip 15 relative to the extrusion die, the function of which is explained in greater detail with reference to FIGS. 8 and 9.

Figure 5:
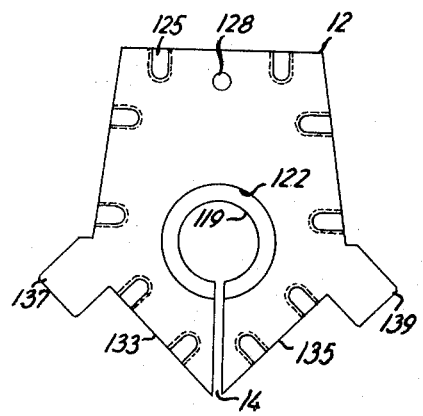
FIGS. 5 and 6 show the two die sections of FIG. 4 seen from the ends facing each other.
Figure 6:
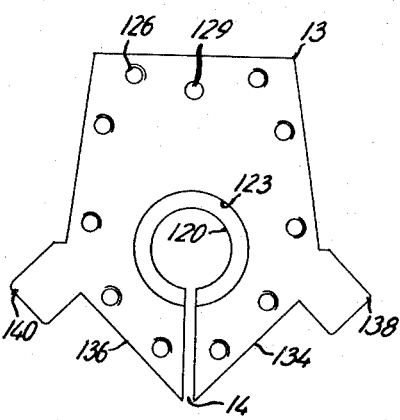

The cross-sectional configuration of die sections 12 and 13 is illustrated in greater detail in FIGS. 5 and 6, which show the two die sections seen from the ends facing each other, elements corresponding to the ones shown in FIG. 4 being designated by the same reference numbers. Communicating with die channels 119 and 120, slits are provided in each of die sections 12 and 13 to form, in the assembled state of the two sections, linear extensions of each other and make up the single, continuous outlet slit 14 of the assembled extrusion die. In the lowermost portion of each die section, oblique contact surfaces 133 and 134, respectively, are formed for die lip 15 and corresponding contact surfaces 135 and 136, respectively, are formed for the other die lip 16, said contact surfaces being terminated upwardly by projecting portions on each side of the die sections, such as shown in FIG. 5 at 137 and 139 and in FIG. 6 at 138 and 140. Since the two contact surfaces 133, 135 and 134, 136, respectively, form equally large angles, in the embodiment shown 45°, with the vertical symmetry plane of the die sections, it will be possible, by means of setting screws, such as shown in FIG. 4, in connection with projecting portions 137, 138 and 139, 140 to adjust the positions of the die lips 15 and 16 so as to control the orifice of the outlet slit.

FIG. 7 shows in greater detail the construction of guide ring 121 which is intended to ensure a conaxial mounting of die sections 12 and 13. As will be apparent from this figure, ring 121 is, on a portion 141 of its circumference corresponding to the orifice of outlet slit 14, reduced in its dimension in the axial direction of the die. By rounding off portion 141, it is ensured that material extruded through the outlet slit at this point is merged again so that a discontinuity in the film produced is obviated.

Figure 8:
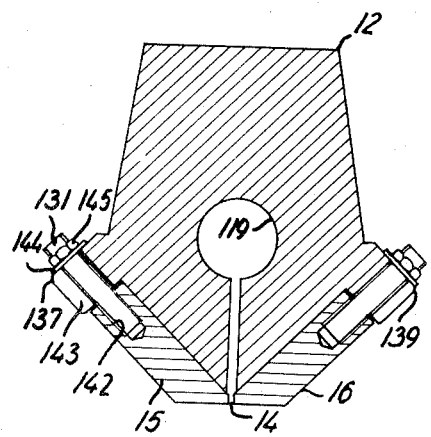
Figure 9:
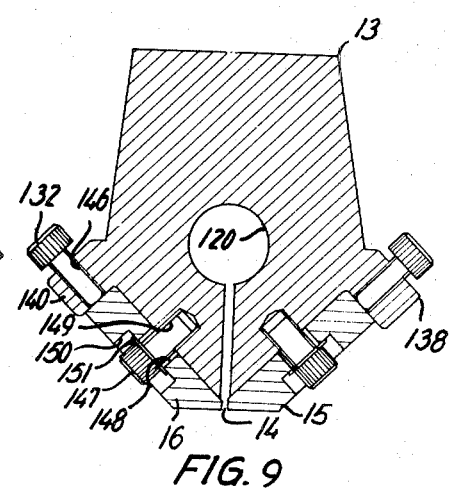

FIGS. 8 and 9, which show sections taken along lines VIII—VIII and IX—IX, respectively, in FIG. 2, illustrate in greater detail the control of the orifice of outlet slit 14 of the extrusion die by adjustment of the die lips 15 and 16 extending throughout the width of the die on each side of die sections 12 and 13. As already mentioned, the adjustment of die lips 15 and 16 is effected by means of setting screws 131 and 132, pairs of such setting screws being arranged at regular mutual distances along the entire width of the die. As shown in FIG. 8, setting screw 131 is constituted by a stud bolt which is screwed into a tapped bore 142 in the die lip and a portion of which projecting from said lip is located in a cut-out 143 in the projecting portion 137 or 139 of the die section with a washer 144 mounted on the free end of the stud bolt, for abutting against the topside of the projecting portion and a nut 145 screwed onto the stud bolt above washer 144. By tightening nut 145 die lip 15 or 16 will be drawn, at the location of screw 131, towards the projecting portion 137 or 139.

As shown in FIGS. 4 and 9, setting screw 132 is constituted by a screw which is screwed through a tapped bore 146 in projecting portion 138 and 140 of the die section and exerts, with its free end, a pressure against the top edge of die lip 15 or 16 so that, by tightening screw 132, bar 15 or 16 will be pushed away from projecting portion 138 or 140.

Die lips 15 and 16 are secured to opposite sides of the assembled extrusion die sections 12 and 13 by means of screws 147 disposed at regular mutual distances which, through bores 148 in the lip, are screwed into tapped bores 149 in the die sections. Bores 148 in the die lips are oblong with their longest dimension in the direction of adjustment of the die lips. Communicating with the oblong bores 148, concentric, cylindrical cutouts 150 are formed in the external side of die lips 15 and 16, said cut-outs providing space for the heads of screws 147 which abut against washers 151.

When adjusting a die lip at a given point along die 11, screw 147 is loosened first, whereupon the adjustment is carried out by tightening either nut 145 or screw 132, and subsequently screw 147 is tightened again.

With the construction of a wide-orifice extrusion die as proposed by the invention for use in a film extrusion apparatus, it has been found possible to produce film-material having uniform thickness and a significantly greater width than has hitherto been known. While difficulties in achieving sufficiently good flow of the melted material through the entire die channel have hitherto limited the maximum die width attainable to approximately 8 feet, a die width of approximately 15 feet has in practice been achieved in a die of the type shown in the drawings.

The specially constructed guide ring 121 which, according to the invention, is mounted in the junction between the two die sections, ensures a good linearity between the die channels of the sections as it compensates, to a certain extent, for inaccuracies present therein. Moreover, the reduced axial dimension of the guide ring on the portion of its circumference located above the outlet slit of the extrusion die has the effect of obviating formation of beads in the sheet.

The utilization of two die lips 15 and 16 extending throughout the width of the die and, consequently, along all the die sections, the mutual distance of which is selectively variable along the lips, results in a fine adjustment of the orifice of the outlet slit and, thereby, of the thickness of the film.

In the embodiment shown, connecting ducts 9 and 10 from extruders 1 and 2 are connected to the central region of extrusion die sections 12 and 13 in order to ensure the greatest uniformity possible of the flow of melted thermoplastic material throughout the length of the die channel. In this connection it is, of course, a precondition that extruders 1 and 2 operate synchronously as far as possible with respect to the heating of the material and the pressure at which it is forced through the extrusion cylinders 5 and 6 and ducts 9 and 10 towards the die 11. As an additional means for ensuring a good flow, it is possible, in a manner known per se and not shown in greater detail, to provide external heating elements on die sections 12 and 13.

Moreover, with the extrusion die shown, it is possible, in a known manner, to control the lateral width of the film by means of stop elements not shown in the drawings, which are introduced through holes in end plates 17 and 18, into outlet slit 14 immediately above die lips 15 and 16.

It is to be noted, however, that the extrusion die shown in FIGS. 4 to 9 is not limiting to the present invention but represents an advantageous construction of the long extrusion die with respect to structure and manufacture. As an alternative the extrusion die may be composed of two die sections each of which extends throughout the length of the die, said sections being assembled in a plane incorporating the axis of the die channel, preferably a plane extending through the outlet slit so that each of the sections incorporates one half of the die channel. However, due to the great area of the surfaces facing each other of the die sections it may be difficult to obtain an adequate sealing of the extrusion die.

Furthermore, it is within the scope of the invention to use an extrusion die constructed in one continuous piece, the manufacture of such a die being, however, more complicated owing to the difficulties in obtaining a sufficient accuracy of a die channel made by deep-drilling in such a long workpiece.

Figure 10:
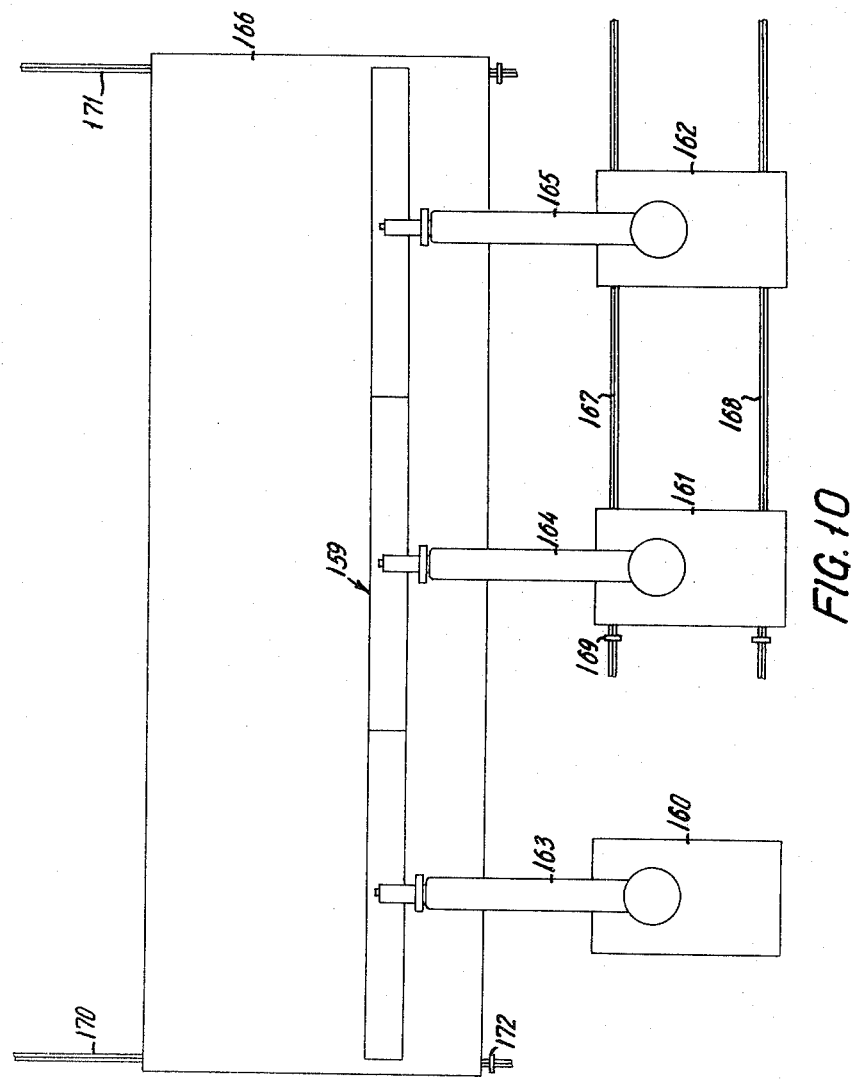
FIG. 10 is a plane view of another embodiment of the apparatus according to the invention.

In FIG. 10, another embodiment of an extrusion apparatus according to the invention is shown in a purely diagrammatical manner, in which an elongated wide-orifice extrusion die 159 composed of three die sections is fed from three extruders 160, 161 and 162 mounted on one side of the die, the extrusion cylinders 163, 164 and 165 of which extend transversely to the extrusion die 159. This configuration of the apparatus is preferably intended for the direct extrusion of a plastic film where no prefabricated sheet is to be supplied from the outside. The film extruded from the outlet slit of extrusion die 159 is removed by means of a calender unit 166 not shown in detail which may, however, have exactly the same principal construction as the roller supporting unit of the apparatus shown in FIGS. 1-3, with the exception of the transport rollers preceeding cooling rollers 24 and 25.

In the embodiment shown in FIG. 10, extruders 161 and 162 are movably supported on common profiled rails 167 and 168 which may be fitted with stop members as shown at 169 so that the total kinetic energy generated by the axial thermal expansion of the extrusion die is absorbed by these extruders. Calender unit 166 is mounted in a corresponding manner on profiled rails 170 and 171 with stop members as shown at 172. In this embodiment it will, of course, be possible to move the calender unit only to the side of extrusion die 159 remote from extruders 160-162.

It will be appreciated that the construction of the profiled rails 167, 168 and 170, 171 and the guiding means corresponding thereto on extruders 160-162 and calender unit 166, respectively, may be identical with the one shown in FIGS. 1-3.

I claim:

1. An extrusion apparatus for producing sheet-material in great width dimensions consisting at least partly of a thermoplastic material, comprising at least two extruders; a wide-orifice extrusion die including at least one die channel extending throughout the length of the die and an outlet slit communicating with said die channel for extruding thermoplastic material; means for connecting said extruders to said extrusion die to provide a direct communication from each extruder to one and the same die channel; a roller system including at least one cooling roller for cooling the sheet-material subsequent to the extrusion of thermoplastic material and a number of transport rollers for conveying the sheet material produced after cooling; means for supporting at least one of said extruders for movement in the width direction of the extrusion die; and means for mounting said roller system to be displaceable transversely to the axial direction of the die.

2. An extrusion apparatus as claimed in claim 1, wherein said extrusion die comprises at least two die sections which are clamped together to form at least one die channel.

3. An extrusion apparatus as claimed in claim 2, wherein said die sections are arranged in co-axial extension of each other and are connected with individual extruders communicating with one and the same die channel.

4. An extrusion apparatus as claimed in claim 3, further comprising two unbroken die lips arranged on the extrusion die on opposite side of said outlet slit to define the extrusion orifice thereof and extending throughout the length of all die sections.

5. An extrusion apparatus as claimed in claim 3, wherein two die sections to be clamped together are provided at the end faces facing each other with cylindrical cut-outs formed around said die channel and a guide ring having a reduced axial dimension on a portion of its circumference corresponding to the extrusion orifice of said outlet slit is mounted in said cut-out.

6. An extrusion apparatus as claimed in claim 1, wherein one of said extruders is stationary.

7. An extrusion apparatus as claimed in claim 1, wherein two extruders are arranged outside either end of said extrusion die.

8. An extrusion apparatus as claimed in claim 7, wherein said roller system is arranged to be displaceable to both sides of said extrusion die and means are provided for securing said system in a well-defined position relative to said die.

9. An extrusion apparatus as claimed in claim 1, wherein said extruders are mounted on one side of the extrusion die and said roller system is arranged to be displaceable to only the opposite side of the extrusion die.

10. An extrusion apparatus as claimed in claim 1, wherein said roller system and each movably supported extruder are provided with wheels and with guiding means to be mounted on profiled rails.

11. An extrusion apparatus as claimed in claim 10, wherein said rails are provided with stop members for restricting the movement of said roller system and said movably supported extruder.

* * * * *